United States Patent [19]
Schwarz

[11] Patent Number: 5,486,810
[45] Date of Patent: Jan. 23, 1996

[54] INFRARED DETECTOR FOR DETECTING MOTION AND FIRE AND AN ALARM SYSTEM INCLUDING THE SAME

[76] Inventor: Frank Schwarz, 156 Thunderhill Dr., Stamford, Conn. 06902

[21] Appl. No.: 355,060

[22] Filed: Dec. 13, 1994

Related U.S. Application Data

[62] Division of Ser. No. 12,432, Feb. 2, 1993.

[51] Int. Cl.$^6$ .............. G08B 19/00; G08B 13/18; G08B 17/12
[52] U.S. Cl. .............. 340/521; 340/556; 340/567; 340/578
[58] Field of Search ............... 340/541, 565, 340/567, 578, 588, 584, 517, 521, 522, 555, 556; 250/DIG. 1, 338.1

[56] References Cited

U.S. PATENT DOCUMENTS

| | | | |
|---|---|---|---|
| 4,052,716 | 10/1977 | Mortensen | 340/567 X |
| 4,230,950 | 10/1980 | Forss et al. | 250/574 |
| 4,242,673 | 12/1980 | Cooper | 250/574 |
| 4,314,239 | 2/1982 | Odone et al. | 340/556 |
| 4,319,229 | 3/1982 | Kirkor | 340/521 |
| 4,321,591 | 3/1982 | Vieweg | 340/521 |
| 4,438,428 | 3/1984 | Ober et al. | 340/521 |
| 4,446,454 | 5/1984 | Pyle | 340/538 |
| 4,484,181 | 11/1984 | Schwartz | 340/521 |
| 4,488,049 | 12/1984 | Marsocci | 250/574 |
| 4,533,094 | 8/1985 | Steinman, Jr. | 340/521 |
| 4,660,024 | 4/1987 | McMaster | 340/522 |
| 4,746,906 | 5/1988 | Lederer | 340/522 |
| 4,754,150 | 6/1988 | Orioka et al. | 250/574 |
| 4,870,394 | 9/1989 | Corl et al. | 340/630 |
| 4,943,800 | 7/1990 | Ikeda et al. | 340/567 |
| 5,077,548 | 12/1991 | Dipoala | 340/522 |
| 5,117,223 | 5/1992 | Tanner | 340/693 |
| 5,126,718 | 6/1992 | Doctor | 340/567 |
| 5,243,326 | 9/1993 | Disabato | 340/555 |
| 5,264,708 | 11/1993 | Hijikata | 340/578 X |
| 5,280,272 | 1/1994 | Nagashima et al. | 340/630 |
| 5,317,620 | 5/1994 | Smith | 340/567 X |
| 5,339,070 | 8/1994 | Yalowitz et al. | 340/578 |

Primary Examiner—Victor R. Kostak
Assistant Examiner—John W. Miller
Attorney, Agent, or Firm—David P. Gordon

[57] ABSTRACT

A integrated IR detector for detecting both motion and fire/smoke includes in one embodiment a single source of IR radiation and separate IR sensors for sensing motion and smoke. The separate sensors are coupled by their outputs to separate amplifier circuits and provide separate outputs indicating motion (intrusion) detection and smoke detection. The entire arrangement of IR source and dual sensors are mounted in a single housing and powered by a common power supply. In a second embodiment, a single passive IR motion detector having a pair of phase opposed series connected sensors is coupled to a circuit for detecting motion (intrusion) while one of the pair of sensors is coupled to a circuit for sensing changes in ambient temperature. The circuit for detecting ambient temperature changes includes logic analysis and time constant filtering to produce an alarm signal only when ambient temperature changes exceed a preset threshold rate of degrees per second. Common power supplies and control units are disclosed which allow coupling alarm signals on a single two-wire or four-wire circuit.

7 Claims, 5 Drawing Sheets

INFRARED DETECTOR FOR DETECTING MOTION AND FIRE AND AN ALARM SYSTEM INCLUDING THE SAME

This is a divisional of co-pending application Ser. No. 08/012,432 filed on Feb. 2, 1993.

BACKGROUND OF THE INVENTION

The present invention relates to alarm systems. More particularly, the present invention relates to alarm systems utilizing infrared sensors for sensing both motion and fire or smoke.

Infrared (IR) detectors are widely known in the arts of intrusion detection and in fire/smoke detection. These detectors have basically two forms: active and passive. Passive IR detectors generally employ a group of radiation sensors coupled through amplifiers to a logic circuit. The radiation sensors detect changes in ambient infrared radiation (temperature). Because the ambient is subject to changes such as might be caused, e.g., by a gust of wind, and which are not the result of an intruder, systems utilizing intrusion passive IR sensors must filter out these changes. In order to filter out background changes, pairs of phase opposed sensors are coupled in series (or parallel) so that an identical change in temperature sensed by both sensors simultaneously is cancelled through "common mode rejection". With this arrangement, an intruder moving across the field covered by the sensors produces different changes in temperature at each sensor, or the same change but at different times.

Passive IR sensors are also used as fire detectors. When used as fire detectors, the passive IR sensors are coupled to a circuit which monitors the rate of increase in ambient temperature. If the rate of increase in ambient temperature is above a certain preset value, a fire warning is activated. A similar arrangement can be used to detect freezing by measuring the rate of decrease in ambient temperature. A rather sophisticated group of passive IR sensors is disclosed in U.S. Pat. No. 4,052,716 to Mortensen for "Fire and Intruder Detection and Alarm Apparatus." Mortensen's device includes a plurality of passive IR sensors arranged in series and coupled to bridge circuits to mask irrelevant changes in ambient temperature and minimize false alarms when used in fire detection or intruder detection.

Active IR detectors include a radiation source and an IR sensor which is sensitive to interruptions in the radiation sensed from the source. These detectors are used as intrusion detectors by providing a "path" of radiation from the source to the sensor in a place where the path is likely to be crossed (interrupted) by an intruder. As a smoke detector, active IR sensors are placed where smoke is likely to interrupt the path of radiation between the source and the sensor.

Among the most used and most effective type of intrusion detection devices are the passive IR detectors which in recent years have replaced other types such as microwave or ultrasonic detectors. Detectors based on the teachings of U.S. Pat. No. 3,958,118 are ubiquitous in the alarm industry. These very sensitive IR detectors are used exclusively to detect motion of an intruder whose body heat is detected.

In recent years there has been a trend towards combining systems for detecting intrusion, smoke, fire, freezing, etc. Generally, combination systems are more economical than separate systems because labor costs are reduced when installing multiple systems at the same time. In addition, common components such as a common power source and/or common alarm can be used, whereby the separate detector systems are powered by the same power source and trigger the same alarm. An example of such a system is disclosed in U.S. Pat. No. 4,484,181 to Schwartz for a combination burglar and smoke alarm where a smoke detector is housed in a compact case which also includes a spring switch which closes upon the movement of a door to which the case is clamped. A single sounding device is activated by the smoke sensor or the burglar-detect switch. U.S. Pat. No. 4,321,591 to Vieweg, utilizes the same concept and provides an ultrasonic burglar alarm, a smoke/gas detector, and an alarm clock in a single housing with a common power supply.

While most of these combination systems are "portable", the combination system concept has been applied to fixed installations as well. U.S. Pat. No. 4,319,229 to Kirkor discloses separate sensors for heat, smoke and IR radiation mounted in a common housing and wired to a single common alarm or remote annunciator. A similar approach is taken in U.S. Pat. No. 4,446,454 to Pyle for a "Home Security System" which includes separate sensors for intrusion and fire/smoke which transmit signals to a single alarm system.

While each of the above-described systems has a well served purpose, the systems of the art have not been designed to optimally integrate the various components of the system. For example, even in the so-called combination systems, the disclosed arrangements require that either separate sources (in the case of active IR systems) or separate sensors (in the case of passive IR systems) be provided for each detection function such as intrusion, smoke/fire, etc. Of course, each source and sensor has its separate economic cost in terms of manufacture and installation and the additional support such as wire and power that each separate source or sensor requires.

SUMMARY OF THE INVENTION

It is therefore an object of the invention to provide a single combination sensor capable of detecting both intrusion and fire or smoke simultaneously.

It is also an object of the invention to use an existing passive IR intrusion detector to provide an indication of rapid rise in ambient temperature (fire) as well as to provide an indication of intrusion.

It is another object of the invention to provide an active IR detector having a single radiation source and a pair of sensors, one situated to detect motion and the other situated to detect smoke.

It is still another object of the invention to provide means for differentiating the type of condition detected by a single combination sensor so that a different type of alarm can be activated in the case of intrusion or in the case of fire.

It is yet another object of the invention to provide a means for communicating the combined output from a combination sensor capable of detecting both intrusion and fire/smoke simultaneously on a single two-wire circuit while maintaining the ability to distinguish between intrusion detection and fire/smoke detection.

In accord with these objects which will be discussed in detail below, the combination fire/smoke/intrusion alarm detectors of the present invention include in one embodiment an active IR detector having a single radiation source and two separate sensors. One sensor is arranged relative to the radiation source to detect motion and the other is arranged relative to the radiation source to detect smoke or particulate matter. A common power supply feeds the radiation source and both sensors while a circuit combining separate amplifiers for each sensor provides an output which may be distinguished as to fire/smoke/intrusion. A second embodiment of the invention provides a dual element passive IR sensor using common mode rejection to sense intrusion. A second output from the dual element passive IR sensor is taken without common mode rejection to detect changes in ambient temperature. This second output is coupled to circuitry which determines rate of change in ambient IR temperature so that a fire condition may be detected. Additional embodiments of the invention include means for coupling the outputs of one or both of the combined detectors and communicating the combined output via a two-wire or four wire alarm circuit.

Additional objects and advantages of the invention will become apparent to those skilled in the art upon reference to the detailed description taken in conjunction with the provided figures.

DETAILED DESCRIPTION OF THE PREFFERED EMBODIMENTS

Figure 1A:
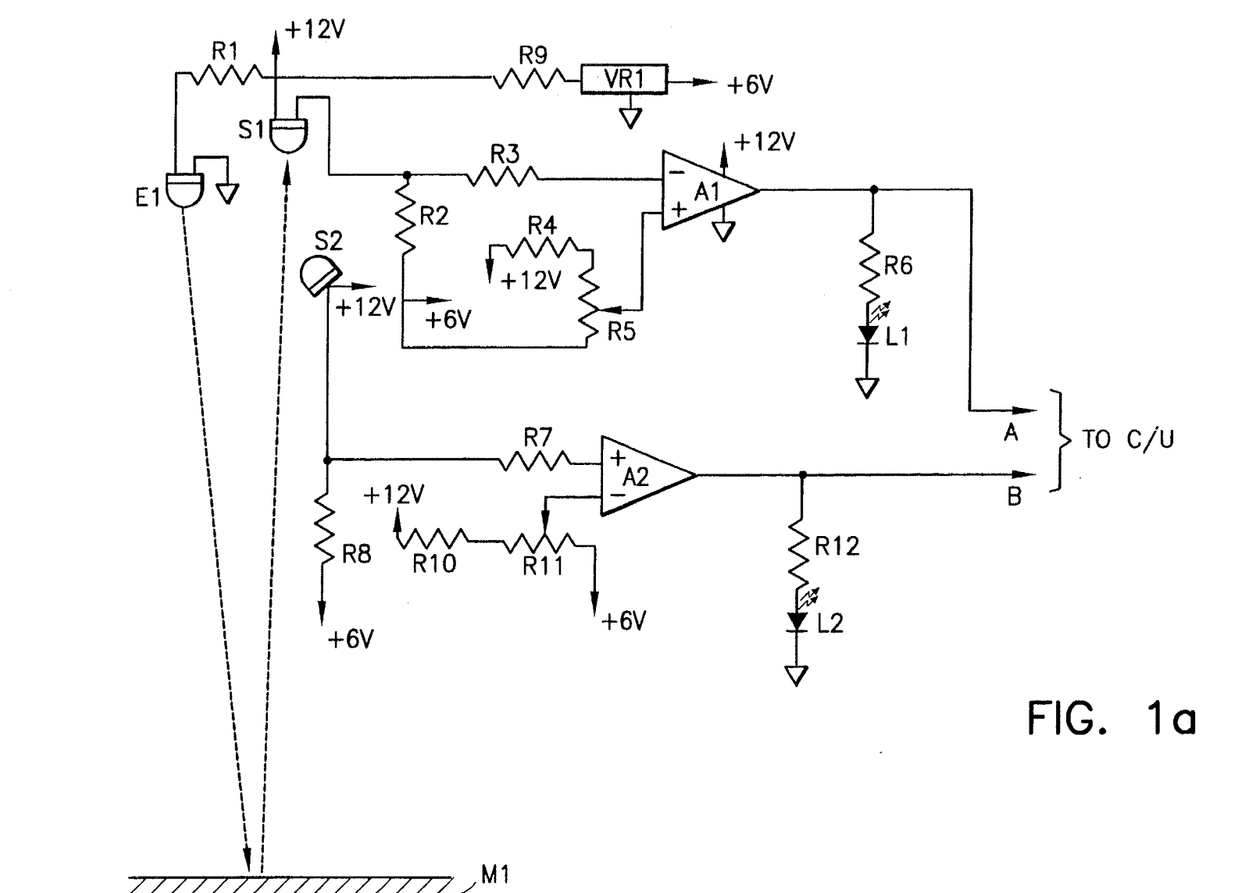
FIG. 1a is a schematic diagram a first embodiment of the invention utilizing an active IR detector for detecting both intrusion and smoke.
Figure 3A:
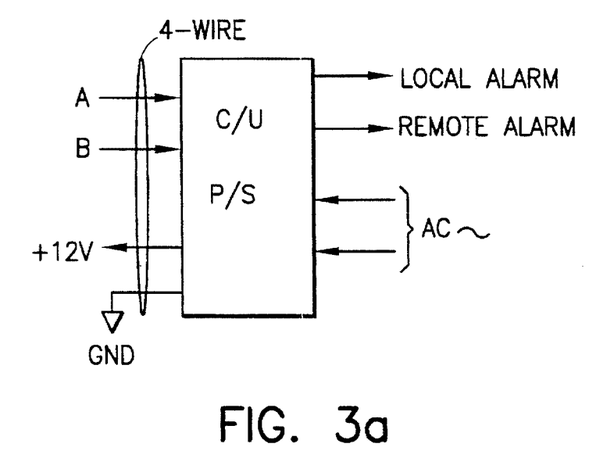
FIG. 3a is a schematic diagram of one example of a control unit and power supply for use with the multiple function detector circuits of the embodiments.
Figure 3B:
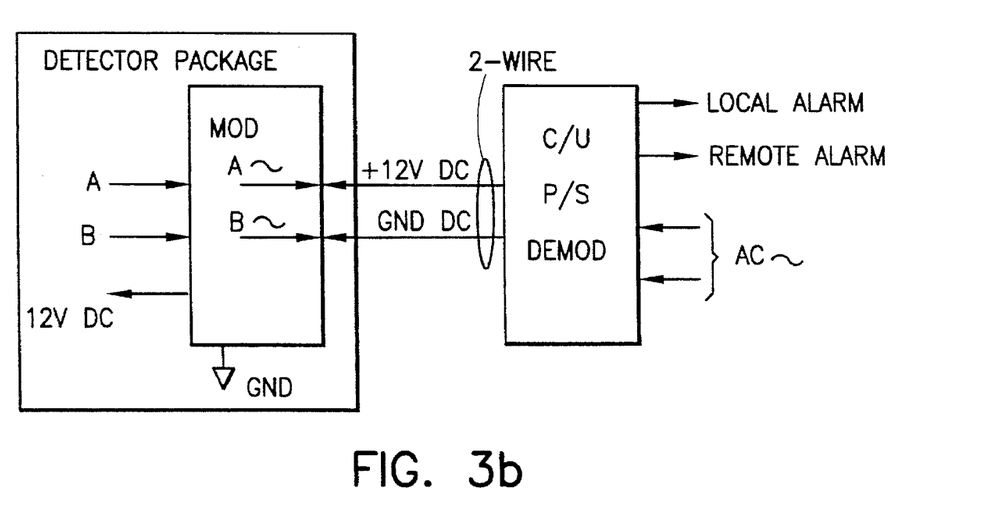
FIG. 3b is a schematic diagram of a second example of a control unit and power supply for use with the multiple function detector circuits of the embodiments.

FIG. 1a shows a first embodiment of an integrated system utilizing an active IR detector for detecting both motion and smoke. The circuit shown in FIG. 1a includes a single source of radiation E1 receiving +12 V power from a power supply shown in FIG. 3. Current to E1 is limited by resistor R1. The radiation source E1 emits IR radiation through a built in lens at a relatively narrow angle of dispersion and the radiation is reflected by any reflective surface M1 such as shown in FIG. 1a. The reflected radiation from source E1 is detected by a first IR sensor S1 which may be a Photo-FET and which may be located in the same housing (e.g., box) as source E1 if desired. As will be appreciated, the reflectivity of surface M1 is not particularly important, provided that the sensor S1 can sense some reflection, and provided that a calibration mechanism is available, as described hereinafter.

Where the first IR sensor S1 is a Photo-FET, the drain of the FET is coupled to the +12 V power supply and the source of S1 is coupled to a +6 V voltage source through load resistor R2. The +6 V voltage source is generated from the +12 V power supply by voltage regulator VR1 which is coupled to the +12 V power supply through current limiting resistor R9. Besides being coupled to the +6 V voltage source, the source of Photo-FET S1 also provides an output signal through resistor R3 to the negative input of an operational amplifier (op-amp) A1 which is powered by the +12 V power supply. The positive input of op-amp A1 is coupled to a voltage divider comprising resistor R4 and potentiometer R5. Potentiometer R5 effectively constitutes the aforementioned calibration mechanism and is set to a voltage that will make the output of A1 an appropriately chosen low value near zero. Thus, when infrared radiation from E1 is detected by sensor S1 (normal condition), the output of A1 is low. However, if the path of radiation (shown by the dotted lines in FIG. 1a) from E1 to S1 is interrupted, for example by a person walking across the path, the output voltage at the source of Photo-FET S1 drops. The op-amp A1 will then produce a positive output indicating an intrusion condition.

As those skilled in the art will appreciate, when Photo-FET S1 detects radiation, +12 V is supplied to the negative input of op-amp A1. When no radiation is detected by sensor S1, the negative input of A1 drops to +6 V. Since the positive input of op-amp A1 is adjusted to provide a zero or near zero output when the negative input is +12 V, the change in voltage from +12 to +6 at the negative input produces a positive output from A1. The output of A1 is fed by conductor A to a control circuit described below with reference to FIG. 3. Optionally, the output of A1 may also be coupled to a light emitting diode L1 through current limiting resistor R6 to provide a local indication of the operation of the detector and to allow adjustment of potentiometer R5.

In the embodiment of FIG. 1a, a second IR sensor S2 is located relative to radiation source E1 to operate as a smoke detector. If desired, sensor S2 may be located in the same housing as source E1 and sensor S1. Regardless, detector S2 is mounted at an angle (e.g., 135°) relative to source E1 as depicted schematically in FIG. 1a. Since the radiation emitted from source E1 is focused to a relatively narrow angle, proper placement of sensor S2 will result in no IR detection by S2 under normal circumstances (i.e. clear air between source E1 and sensor S2). However, if smoke or heavy particulate matter should present itself between source E1 and sensor S2, IR radiation from E1 will be scattered and will be detected by S2.

The circuit coupled to sensor S2 is similar to the one described above with respect to sensor S1, but designed to produce an output when radiation is detected rather than when no radiation is detected. Thus, the drain of Photo-FET S2 is coupled to a +12 V voltage source, and the source of S2 is coupled to a +6 V voltage source via resistor R8 as well as to the positive input of op-amp A2 via resistor R7. The negative input of op-amp A2 is coupled to a voltage divider comprising resistor R10 and potentiometer R11 with resistor R10 coupled to the +12 V source, and potentiometer coupled to the +6 V source. The potentiometer R11 is adjusted such that the output of A2 is zero or near zero when no radiation is detected by sensor S2. As will be appreciated by those skilled in the art, when no radiation is detected by S2, the voltage supplied to the positive input of op-amp A2 is +6 V and rises to +12 V when sensor S2 detects IR radiation. Since the negative input of A2 is adjusted to produce a zero output when the positive input is +6 V, when the positive input rises to +12 V, a positive output will be produced by op-amp A2. The output of op-amp A2 is fed by conductor B to a control circuit described below with reference to FIG. 3. Optionally, the output of op-amp A2 may also be coupled to a light emitting diode L2 through current limiting resistor R12 to provide a local indication of the operation of the detector and to allow adjustment of potentiometer R11.

With the provided arrangement of FIG. 1a, it will be appreciated by those skilled in the art that an active IR detector system is provided for both intrusion and smoke/fire where the system is fully integrated by having a single IR source (E1) rather than separate IR sources for the different functions.

Figure 1B:
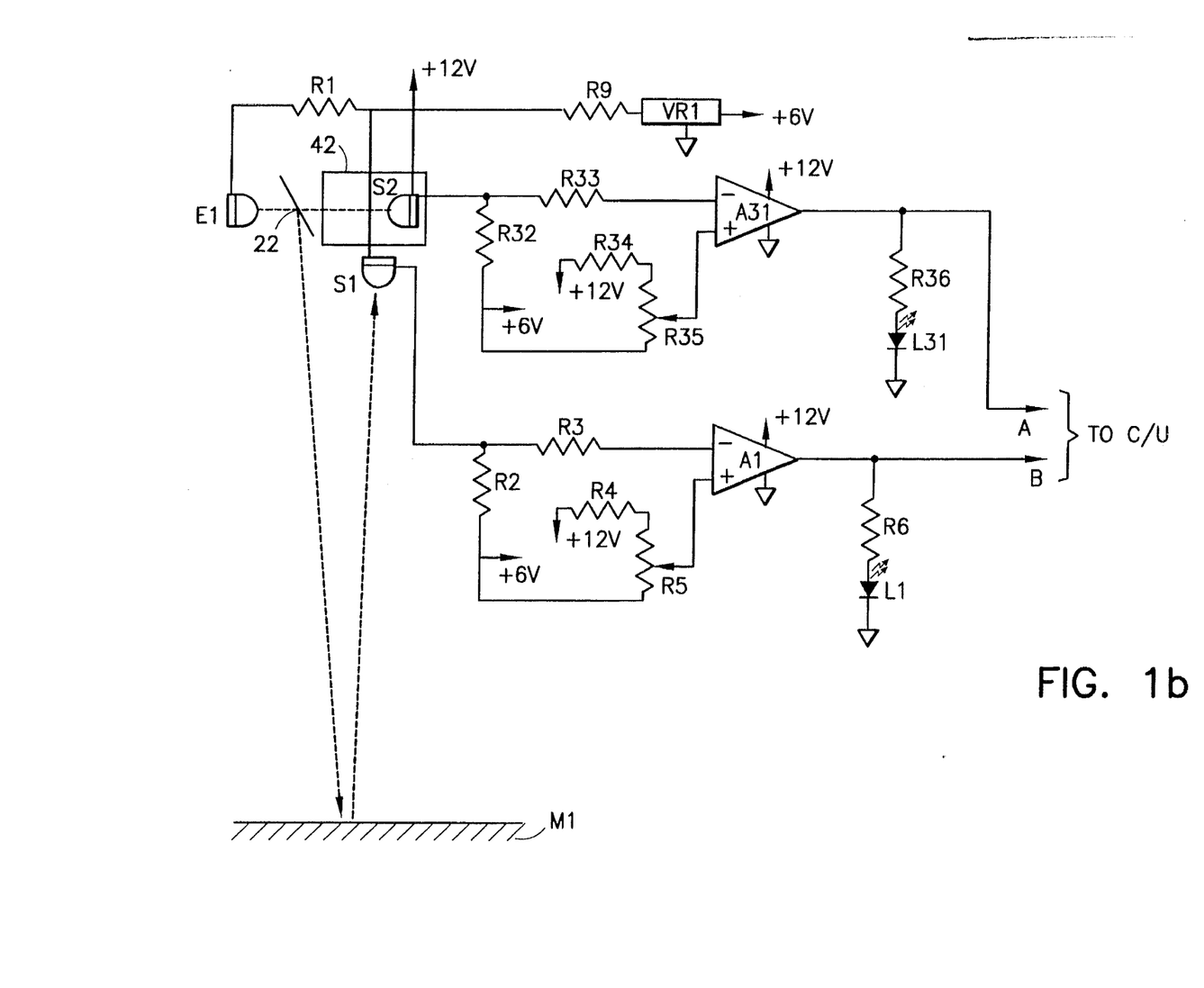
FIG. 1b is a schematic diagram of a second embodiment of the invention utilizing an active IR detector for detecting both intrusion and smoke.

FIG. 1b shows a second embodiment of an integrated system utilizing an active IR sensor for detecting both motion and smoke. As in the embodiment of FIG. 1a, a single source of IR radiation E1 is used with two IR sensors S1 and S2, where sensor S1 is used for sensing motion and sensor S2 is used for sensing for smoke. The circuit (including resistor R1) supplying IR source E1 is the same as the circuit described above with reference to FIG. 1a and the circuit coupled to sensor S1 (including resistors R2, R3, R4, R6, potentiometer R5, op-amp A1, and LED L1) is also the same as described above with reference to FIG. 1a. The placement of the components of sensor S2 relative to IR emitter E1, and the circuit which is coupled to sensor S2, however, are different in this embodiment. Beginning with radiation source E1, it is seen in FIG. 1b that this element is mounted facing sensor S2, and a beam splitting reflector 22 (e.g., a forty-five degree angled 50/50 transmitting and reflecting surface such as red plastic) and a lens 32 are interposed between the emitter E1 and sensor S2. The half surfaced reflector 22 splits the beam of radiation from E1 so that a portion (e.g., half) of the radiation is directed away from the sensor so as to be reflected by surface M1 and detected by sensor S1 as in the embodiment of FIG. 1a. In this aspect, the sensor S1 and its attached circuit function substantially the same way as in FIG. 1a. As to sensor S2, however, it is placed directly in the path of source E1. Thus, instead of being used in a situation where radiation is only detected when smoke or particulates scatter the source beam, sensor S2 in the embodiment of FIG. 1b normally detects radiation, and is used for its ability to provide a different signal when less radiation is detected due to the presence of particulates. Preferably, sensor S2 is located in a compartment such as box 42 with holes (not shown) which allow smoke particulates to enter. The box 42 acts to prevent disturbances which are due to situations other than a fire (e.g., insects, etc.) from reducing detected radiation, and falsely triggering an alarm.

Because the sensor S2 in FIG. 1b is used in the same mode of sensor S1 (i.e., detect interruption of, or less radiation), the circuit coupled to sensor S2 is essentially identical to the circuit coupled to sensor S1. Thus, the circuit coupled to sensor S2 includes resistors R32, R33, R34, R36, potentiometer R35, light emitting diode L31 and op-amp A31 instead of resistors R2, R3, R4, R6, potentiometer R5, LED L1, and op-amp A1. However, because sensor S2 is normally receiving much more IR energy than sensor S1, potentiometer R35 is typically biased at a different setting than potentiometer R5.

It will be appreciated by those skilled in the art that if desired, the embodiment of FIG. 1b can be further integrated by coupling the circuit coupled to sensor S2 directly to sensor S1, and eliminating sensor S2 altogether. While not preferred, this would permit a total interruption of radiation due to intrusion to be sensed by sensor S1 and its accompanying circuit (R2, R3, etc.), and a partial interruption or decrease of radiation due to smoke to be sensed by sensor S1 and the circuit (R32, R33, etc.) which previously accompanied sensor S2.

Figure 1C:
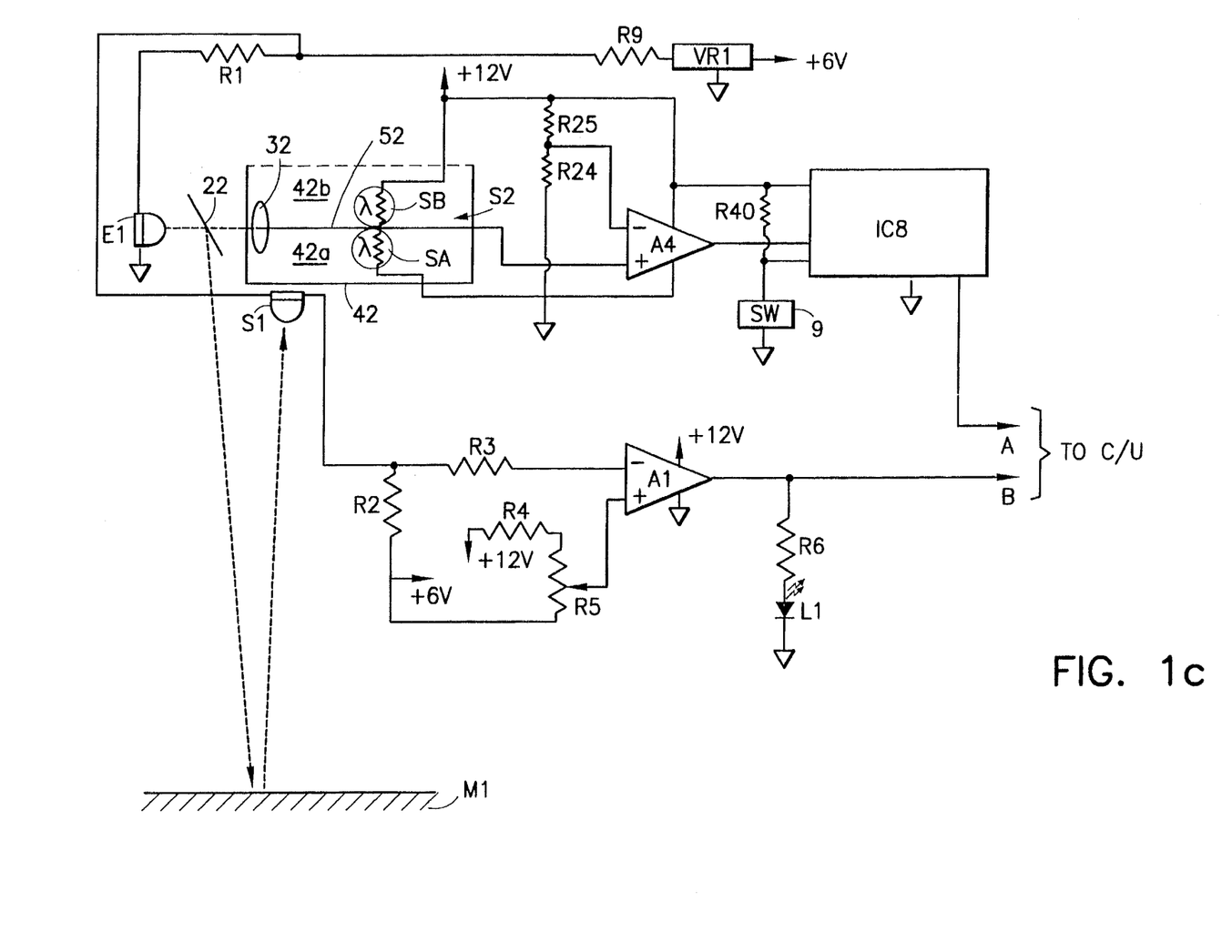
FIG. 1c is a schematic diagram of a third embodiment of the invention utilizing an active IR detector for detecting both intrusion and smoke.

Turning to FIG. 1c, a third embodiment of an active IR detector system is shown. The arrangement of FIG. 1c is the same as that shown in FIG. 1b except that the sensor S2 is placed in a special compartment as described below, and except that the sensor S2 is a dual element sensor. The designation λ in FIG. 1c indicates that the S2 sensor components are light sensitive resistors (photoconductors). In particular, as in the embodiments of FIGS. 1a and 1b, a single source of IR radiation E1 is used with two IR sensors S1 for motion and S2 for smoke. The circuit (VR1, R9 and R1) supplying source E1 is the same as the circuit described above with reference to FIG. 1b and the circuit (R2, R3, R4, R5, A1, R6 and L1) coupled to sensor S1 is also the same as described above with reference to FIG. 1b. The placement of the sensor S2 and the circuit coupled to sensor S2 are different in this embodiment, however. Beginning with radiation source E1, it will be seen in FIG. 1c, that this element is mounted facing detector S2 and a beam splitter (half surfaced reflector) 22 and lens 32 are interposed between E1 and S2. The beam splitter 22 splits the beam of radiation from E1 so that approximately half of the radiation is directed out of the sensor to be reflected by M1 and detected by S1 as in the embodiment of FIG. 1b. In this embodiment, detector S2 is placed in a compartment 42 which contains a lens 32 and a divider 52 which effectively divides the compartment 42 into two portions. Compartment 42b is provided with two openings: one to allow the entry of radiation which is emitted by E1, split by beam splitter 22 and focused by lens 32 onto sensor S2, and another (indicated by dashed lines) to allow ambient atmosphere to interpose between the lens 32 and element SB of sensor S2. Sensor S2 in this embodiment is a dual element (SA and SB) balanced IR photosensitive cell such as a cadmium sulfide or cadmium selenide photoconductor, or equivalent. Normally, when clean air surrounds S2, equal amounts of radiation reach the elements SA and SB from the source E1, and the output of S2 is balanced to this condition. However, if smoke or particulate matter enters compartment 42b and obscures the detection of radiation by one of elements SA or SB by as little as 1–2% relative to the other, the output of sensor S2 is no longer balanced. Thus, while openings are provided in the compartment 42b to permit particulate matter (e.g., smoke) to obscure the detection of radiation by element SB, the divider 42 is provided to prevent the particulate matter from also obscuring detection by element SA. In the unbalanced condition, amplifier A4, which is biased by resistors R24, R25, amplifies the unbalanced output of sensor S2. This amplified output is then processed by logic circuit IC8 to produce a smoke alarm signal at A.

The embodiment of FIG. 1c also includes the addition of a thermal switch 9 which will close at a temperature of 135 degrees F. as an additional detector of hazardous conditions. Thermal switch 9 may be coupled to the same logic circuit IC8 and balanced with resistor R40 thereby making the signal output at A a fire alarm signal in addition to a smoke alarm signal. The remainder of the circuit in FIG. 1c involving the motion sensor S1 is the same as described above with reference to FIG. 1b.

Figure 2:
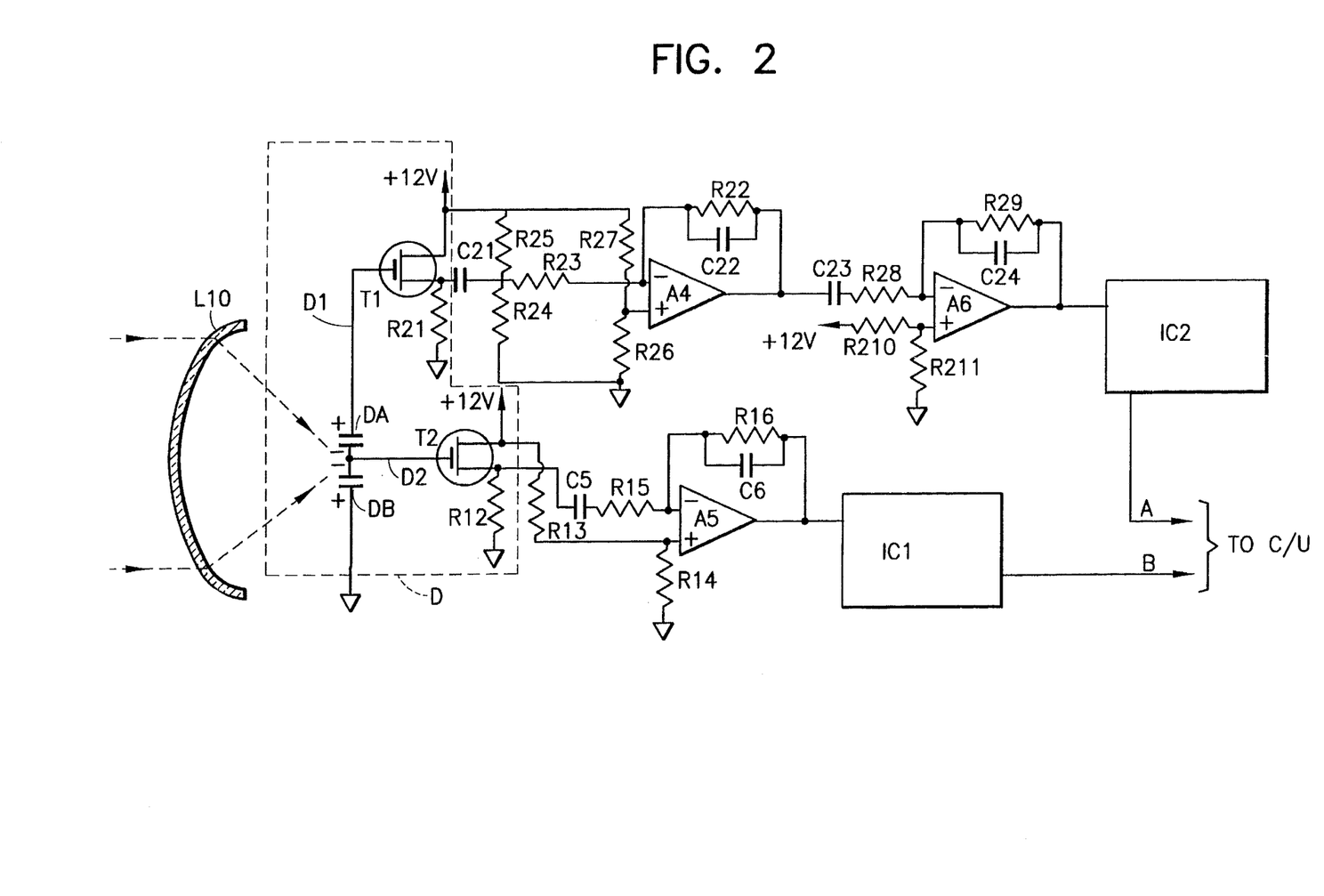
FIG. 2 is a schematic diagram of a fourth embodiment of the invention utilizing a passive IR detector for detecting both intrusion and fire.

Turning now to FIG. 2, a passive dual element pyroelectric detector D is provided to detect both motion and fire (heat). The detector D has two, opposing phase, series connected elements DA and DB which are arranged in a manner normally used for motion detection. The detector shown in FIG. 2 is provided with a segmented (Fresnel) lens L10 focusing a wide area of detection onto elements DA and DB. As a motion detector, elements DA and DB are series connected in opposing phase to the gate of an FET T1. Transistor T1 (having load resistor R21 coupled to its source) is powered by a +12 V power supply described below with reference to FIG. 3 and coupled to its drain. The source output of T1 is coupled to the negative input of a linear amplifier A4 through the RC circuit comprised of R24, R25, and C21, and through resistor R23. The positive input of the linear amplifier A4 is biased by resistors R26 and R27 which form a voltage divider. The aforementioned RC circuit comprised of R24, R25, and C21 preferably provides a low cut-off time constant of typically 0.1 Hz. A high cut-off of about 4 Hz is established by a feedback network comprised of resistor R22 and capacitor C22 which are coupled in parallel between the output and the negative input of amplifier A4. It will be appreciated that the gain of amplifier A4 is determined by the ratio of the resistance values of resistors R22 (feedback resistor) and R23 (input resistor). Because the signal at the source of transistor T1 is very small, the signal from transistor T1 is amplified by amplifier A4, and then fed via capacitor C23 and resistor R28 to the negative input of linear amplifier A6 which amplifies the signal again. The positive input of amplifier A6 is biased by resistors R210 and R211 which form a voltage divider. The output of amplifier A6 is fed back through a second feedback RC filter comprised of resistor R29 and capacitor C24. As described above, the high frequency cut-off is thus determined by R22 and C22 (and/or R29 and C24), while the low frequency cut-off is determined by capacitor C23 and resistor R28 (and/or by capacitor C21 and resistors R25 and R24).

As is well known in the art, the opposing phase, series connection of the two sensor elements DA and DB results in a "common mode rejection" of overall changes in ambient temperature. That is, when each sensor element senses the same change in temperature at the same time, their series connected phase opposition potentials cancel each other to result in a zero output. Only when each sensor element DA, DB senses a different change in temperature or a change in temperature at different times will there appear any output at D1. The output at D1 is amplified as described above by linear amplifiers A4 and A6 and then analyzed by a sequential pulse logic circuit IC2 which determines if the speed, sequence, and pulse amplitudes are appropriate to produce an output (at A) indicative of intrusion (motion detection).

The modification to the passive IR detector shown in FIG. 2 uses one of the same two elements DA and DB (thereby eliminating "common mode rejection") for the purpose of sensing changes in ambient temperature. For example, using sensor element DB, signals are taken from its connection to sensor DA at D2, applied to the gate of FET T2 (which has a load resistor R12 coupled to its source) and subjected to a time constant dictated by capacitor C5 and resistor R15. Since these signals are large compared to the magnitude of the signals produced at D1, they need only be amplified once by being input to the negative input of linear amplifier A5. The positive input of amplifier A5 is biased by resistors R13 and R14 which form a voltage divider, and the output of the amplifier A5 is fed back via a third feedback filter having resistor R16 and capacitor C6 to the negative input. Thus, the output of linear amplifier A5 will represent changes in ambient temperature. In order to distinguish "harmless" changes in ambient temperature from changes which indicate a fire condition, the capacitance of capacitor C5, and the resistance of resistor R15 are chosen to provide a time constant which filters out changes in temperature less than 2° F. in 4 seconds, for example. The output of amplifier A5, representing rapid changes in ambient temperature, may then be subjected to threshold logic analysis by an integrated circuit logic means IC1. If there is sufficient change in ambient temperature over a predetermined time interval, an output is produced at B indicative of a fire condition. The outputs B and A from the passive IR detector of FIG. 2 are coupled to a control unit as described below with reference to FIG. 3.

In the embodiments described above, a plurality of op-amps may be supplied on a single chip such as an LM324 integrated circuit. Moreover, the sensor described in FIGS. 1a or 1b may be combined with the sensor described in FIG. 2 in a single housing with a single A and B output so that intrusion, heat and smoke are all detected at a single location.

Turning now to FIGS. 3a and 3b, two embodiments of power supply and control unit are shown. As shown, the power supply and control unit are combined in the same package, but they could be embodied in separate packages. In the embodiment of FIG. 3a, a control unit C/U and power supply P/S provide a 4-wire connection to one or more sensors as described in FIGS. 1a–1c and 2. This 4-wire connection consists of +12 V and GND from the power supply to the sensor(s) and A and B signals from the sensor(s) to the control unit. The power supply is coupled to an alternating current (AC) source, and the output of the control unit may include separate signals for a local alarm and a remote alarm as shown or may include separate fire and intrusion signals or any combination of output signals as would be apparent to one skilled in the art.

Another embodiment of power supply and control unit is shown in FIG. 3b. This embodiment uses a 2-wire connection to one or more sensors as described in FIGS. 1 and 2. In order to provide separate fire and intrusion detection over a 2-wire circuit, the detector includes a modulator (MOD), and a demodulator (DEMOD) is provided with the control unit C/U and power supply unit P/S. Using modulating or multiplexing techniques known to those skilled in the art, the A alarm signal is provided as a first A/C signal which is modulated onto the +12 V direct current wire (as Av), while the B alarm signal is provided as a second A/C signal which is modulated onto the ground wire (as Bv). When received at the control unit, the modulated signals are demodulated in order to provide separate fire and instrusion signals. It will be appreciated that the use of a modulated 2-wire power supply and control unit with the combination intrusion and fire/smoke detectors of the invention allows for substantial savings since the number of wires and sensor units needed to provide a complete intrusion and fire and smoke detection system is no greater than the number of wires and sensor units presently needed to provide a single fire, smoke, or intrusion detection system. It will also be appreciated that different modulation systems could be utilized. For example, both the A and B signals could be modulated as different frequency signals, different amplitude signals, or pulse code signals, etc., on either of the direct current wires. Alternatively, the system could be a wireless system with the signals being broadcast as an RF output.

There have been described and illustrated herein several embodiments of a combination fire/smoke and intrusion sensor and circuits for operating these sensors. While particular embodiments of the invention have been described, it is not intended that the invention be limited thereto, as it is intended that the invention be as broad in scope as the art will allow and that the specification be read likewise. For example, while still being within the scope of the invention, different aspects of the different detectors and circuits could be combined in different combinations to provide different functionality, provided integration of the system is obtained by eliminating a sensor or a source. Also, additional sensors and sources having yet different functions could be included in conjunction with any of the provided embodiments to provide additional functionality. Further, while particular circuits for amplifying the outputs of detectors have been disclosed, it will be appreciated that other circuits could be utilized. Also, while certain FET sensors have been shown, it will be recognized that other types of sensors could be used with similar results obtained. Moreover, while particular configurations have been disclosed in reference to mirrors and lenses, it will be appreciated that other configurations could be used as well. Furthermore, while the power supply and control unit has been disclosed as having certain inputs and outputs, it will be understood that additional or different inputs and/or outputs can achieve the same or similar function as disclosed herein. It will therefore be appreciated by those skilled in the art that yet other modifications could be made to the provided invention without deviating from its spirit and scope as so claimed.

I claim:

1. A detector which detects motion and changes in ambient temperature comprising:
 a) a first passive infrared sensor and a second passive sensor, said first and second passive sensors coupled to each other in phase opposition and providing a first output;
 b) first circuit means coupled to said first output for providing an intrusion alarm when infrared radiation detected by said first passive infrared detector differs from said second passive infrared detector according to first criteria; and
 c) second circuit means coupled to said first passive infrared sensor at a common connection between said first and second passive infrared sensors for providing an ambient temperature change alarm when said first passive infrared sensor detects a change in infrared radiation that exceeds a predetermined amount over a predetermined time.

2. An infrared detector according to claim 1, further comprising:
 d) segmented lens means proximate said first and second passive infrared sensors for providing said infrared detector with a broad angle of detection.

3. An infrared detector according to claim 1, further comprising:
 a single housing containing said first and second passive infrared sensors and said first and second circuit means.

4. An infrared detector according to claim 1, wherein:
 said first circuit means comprises a first amplifier coupled to said first output and pulse logic means coupled to said first amplifier for providing said intrusion alarm signal; and
 said second circuit means comprises a second amplifier coupled to said common connection and threshold logic means coupled to said second amplifier for providing said ambient temperature change alarm signal.

5. An infrared detector according to claim 1, further comprising:
 modulator means coupled to said first and second circuit means for modulating said intrusion alarm signal and said ambient temperature change alarm signal onto at least one direct current voltage supply wire.

6. An alarm system comprising:
 a) an infrared detector for detecting both fire and motion, said infrared detector comprising,
  1) a first passive infrared sensor and a second passive sensor, said first and second passive sensors coupled to each other in phase opposition and providing a first output,
  2) first circuit means coupled to said first output for providing an intrusion alarm signal when infrared radiation detected by said first passive infrared detector differs from said second passive infrared detector according to first criteria, and
  3) second circuit means coupled to said first passive infrared sensor at a common connection between said first and second passive infrared sensors for providing a fire alarm signal when said first passive infrared sensor detects a change in infrared radiation that exceeds a predetermined amount over a predetermined time;
 b) power supply means for supplying power to said infrared detector; and
 c) control unit means for receiving said intrusion alarm signal and said fire alarm signal.

7. An alarm system according to claim 6, further comprising:
 d) modulator means for modulating at least one of said fire alarm signal and said intrusion alarm signal on a direct current voltage supply wire;
 e) demodulator means in conjunction with said control unit means for demodulating said one of said fire alarm signal and said intrusion alarm signal from said direct current voltage supply wire, wherein said direct current voltage supply wire supplies said power from said power supply means to said infrared detector.

* * * * *